March 18, 1969

G. B. IRELAND ET AL
COOLING MEANS FOR HIGH SPEED HEAVY DUTY
DYNAMOELECTRIC MACHINES 3,433,985

Filed Aug. 1, 1966

INVENTORS
GERALD B. IRELAND
MARION J WITZENBURG
BY
ATTORNEYS

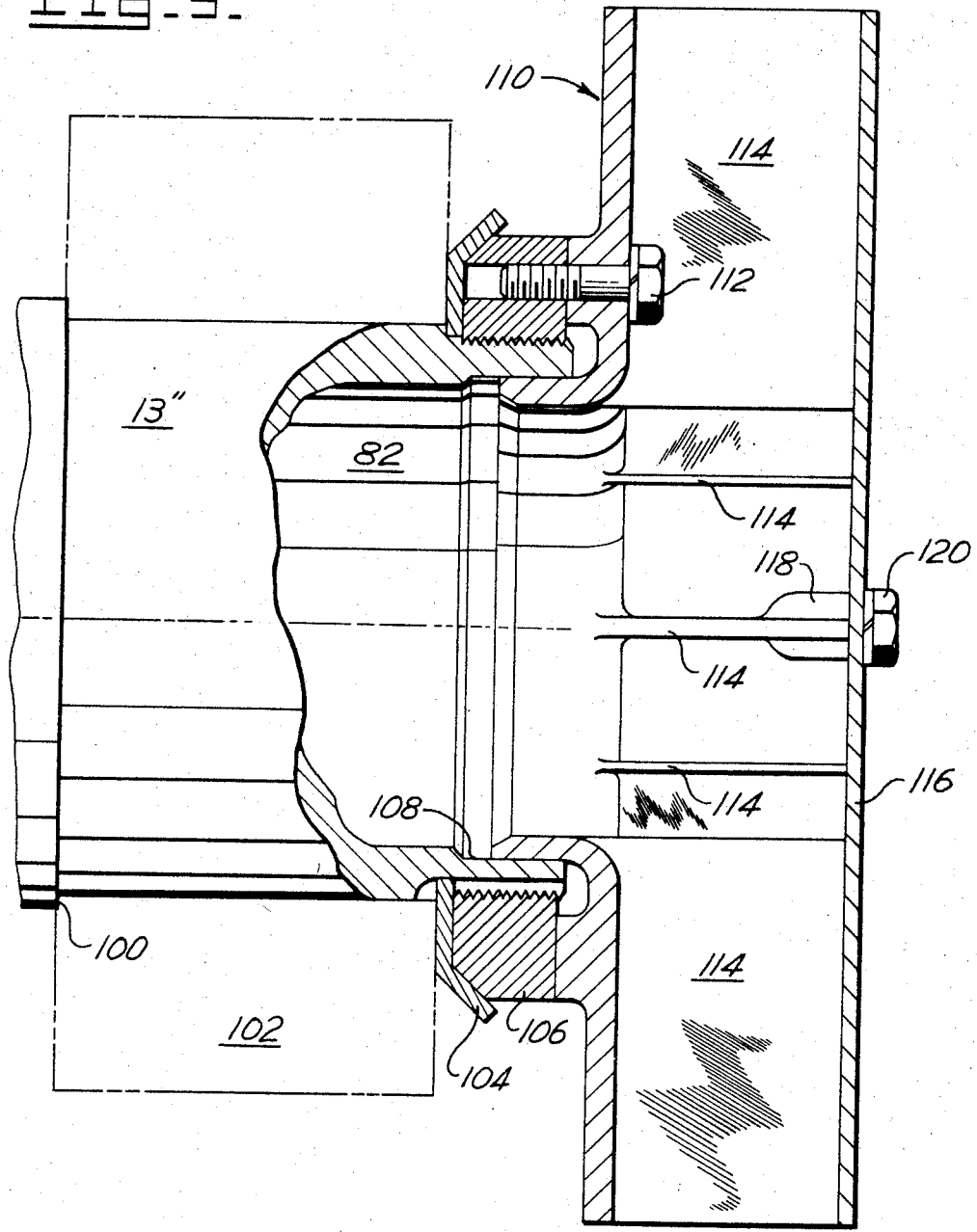

United States Patent Office 3,433,985
Patented Mar. 18, 1969

3,433,985
COOLING MEANS FOR HIGH SPEED HEAVY DUTY DYNAMOELECTRIC MACHINES
Gerald B. Ireland, Morton, and Marion J. Witzenburg, Peoria, Ill., assignors to Caterpillar Tractor Co., Peoria, Ill., a corporation of California
Filed Aug. 1, 1966, Ser. No. 569,451
U.S. Cl. 310—52    3 Claims
Int. Cl. H02k 9/19

ABSTRACT OF THE DISCLOSURE

The rotor shaft of dynamoelectric machine has a hollow first end portion carrying a commutator, a short intermediate portion of enlarged diameter, and a second end portion which carries the rotor core and windings. Axially directed coolant passages in the rotor core are communicated with the hollow end of the shaft at the enlarged section. An apertured partition extends between the casing and the shaft to journal the first end thereof, to define a coolant input compartment therearound and to proportion the coolant flow between the interior and exterior of the rotor, thereby providing for efficient cooling in a compact, high-strength and relatively vibration-free construction.

---

This invention relates to dynamoelectric machines and more particularly to a dynamoelectric machine which is effectively cooled by regulation of a forced air or gas coolant.

While the present invention will be described in relation to D.C. electric motors, it is to be understood that these teachings are equally applicable to the cooling of both A.C. and D.C. generators and motors.

Manufacturers of heavy earthmoving equipment have been faced with perplexing cooling problems in employing electric motors to drive heavy vehicles. As the size of an earthmoving vehicle takes on more massive proportions, the physical dimensions of an electric traction machine to drive it increases and cooling becomes more diffcult. As the maximum vehicle speed is raised, the maximum operating speed expected of the motor is increased which further increases the difficulty of effective cooling. Likewise, as the power of the electric drive machine is raised, the problem of cooling becomes even further complicated.

Thus, in designing electric motors for large earthmoving vehicles engineers are faced with the problem of providing effective cooling without introducing devastating rotor vibrations, and at the same time keeping the weight of the machine to a minimum.

It is, therefore, the primary object of the present invention to provide an effective means for cooling a high speed, heavy duty dynamoelectric machine.

It is another object of the present invention to provide such a machine which is force cooled in either axial direction, part of the coolant being forced through the interior of the rotor and the remainder of the coolant being forced exterior of the rotor but within the casing of the dynamoelectric machine.

It is still another object of the present invention to provide means to regulate the proportion of the total flow of coolant which may flow in either axial direction and which is forced through the interior of the rotor core and the proportion which is forced exteriorly of the rotor but inside the casing of the dynamoelectric machine so as to minimize windage loss and so as to maximize cooling effects.

Further and more specific objects and advantages of the present invention will be seen from the following specification and accompanying drawings.

Figure 1:
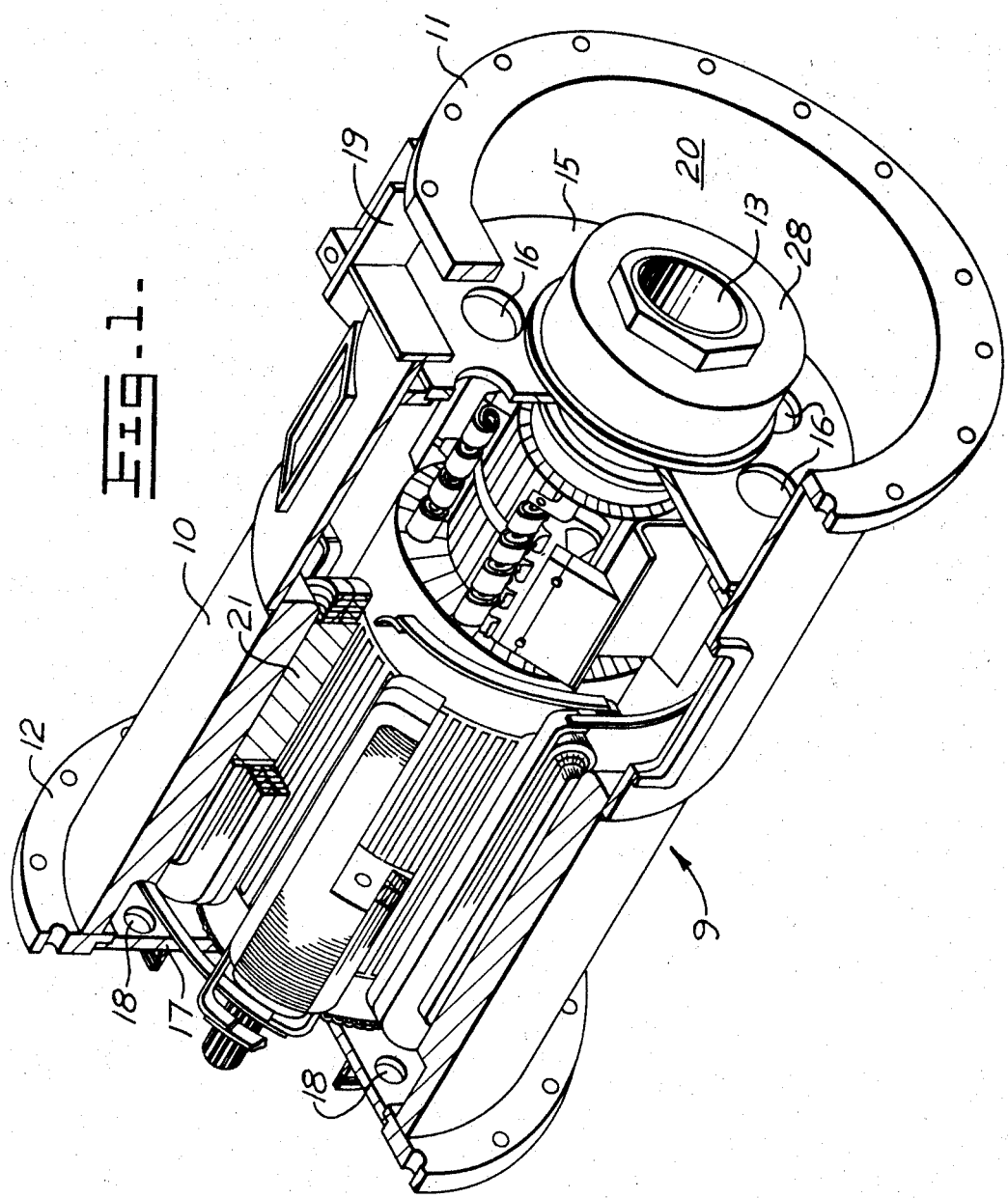
Figure 2:
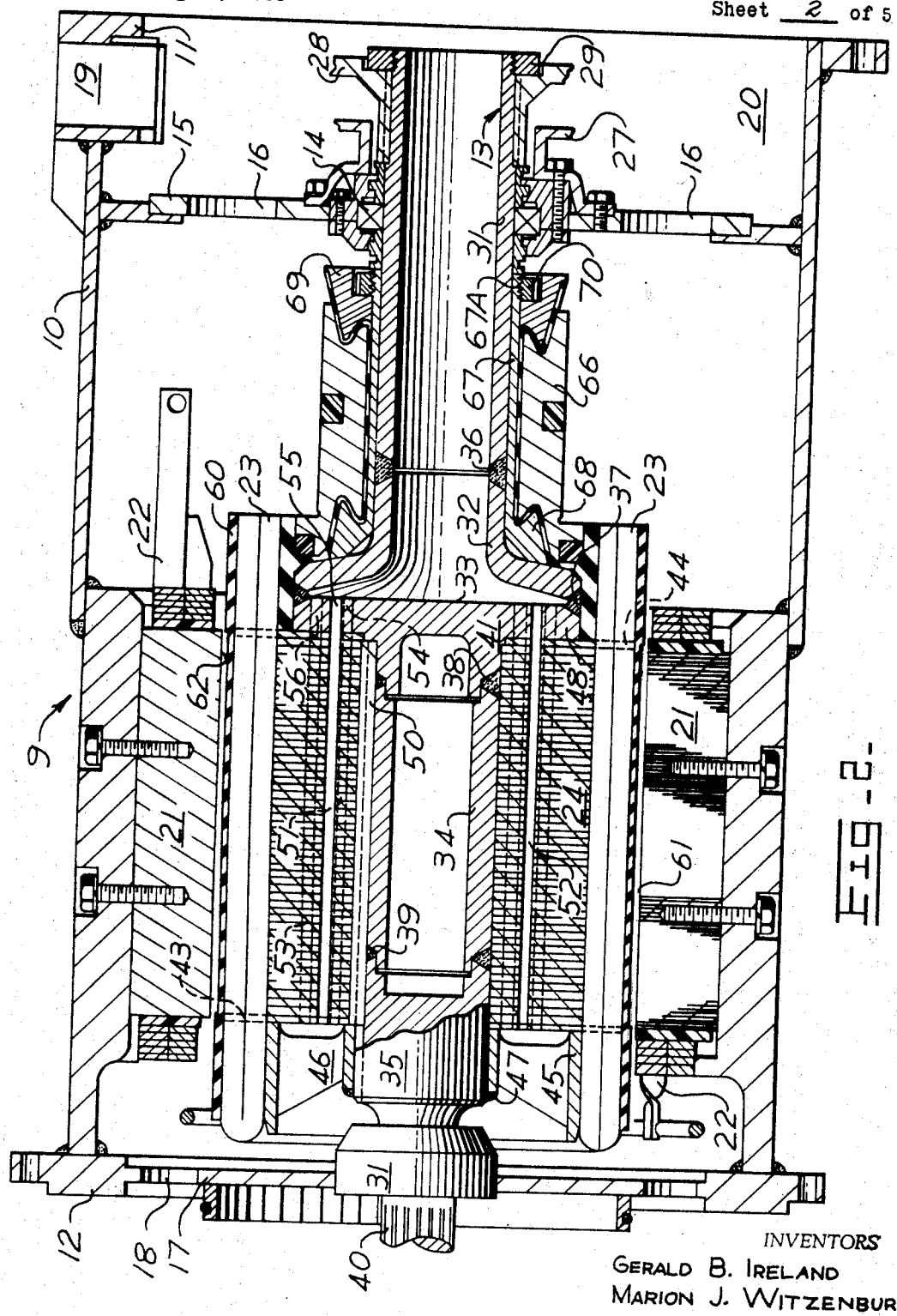
Figure 3:
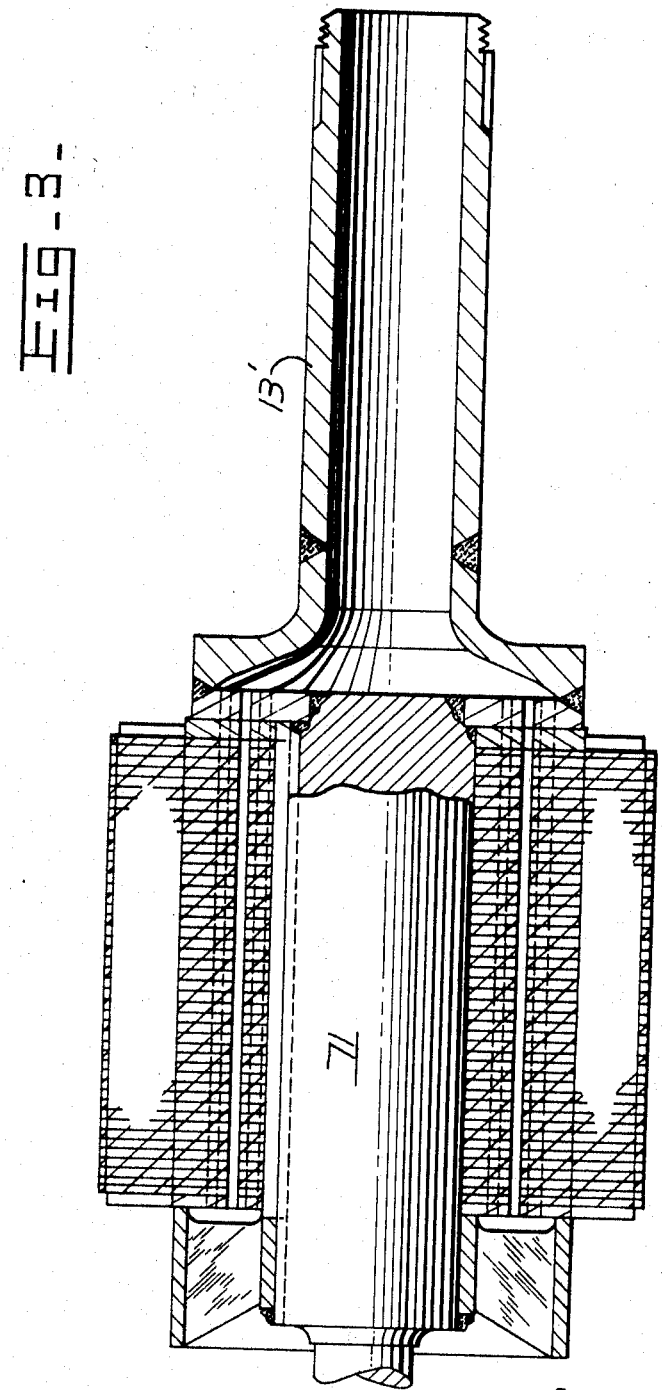
Figure 4:
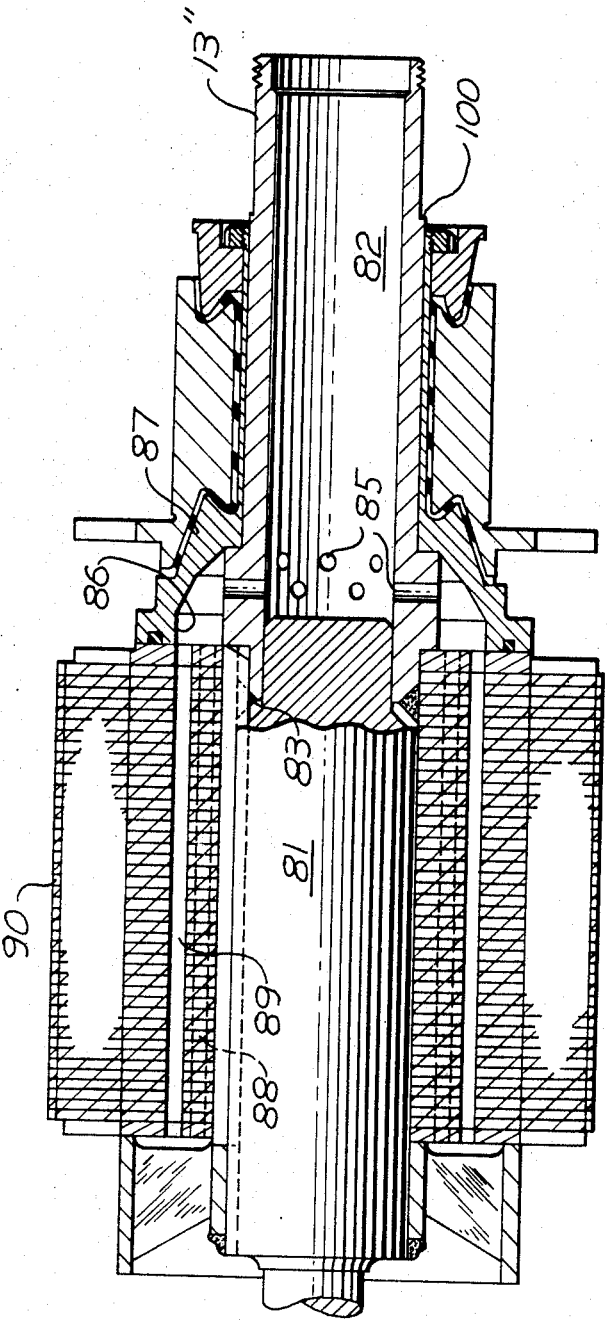

In the drawings:
FIG. 1 is a perspective view of one embodiment of the present invention with some parts broken away and other parts shown in section;
FIG. 2 is a longitudinal cross-sectional view of the embodiment of FIG. 1;
FIG. 3 is a longitudinal cross-sectional view of a rotor which is a modification of the rotor illustrated in FIGS. 1 and 2 and which may be substituted therefor;
FIG. 4 is a cross-sectional view of a rotor which is a modification of the rotor illustrated in FIGS. 1 and 2 and which may be placed in a stator housing similar to that shown in FIGS. 1 and 2; and
FIG. 5 is a view partly in elevation and partly in cross-section of an impeller assembly attachment forming part of the present invention. Referring to FIGS. 1 and 2, a D.C. electric traction motor 9 as may be employed to form part of the drive axle of a vehicle has a casing 10 terminating at either end in flanges 11 and 12. A hollow armature shaft 13 is disposed within casing 10 and mounted in bearings 14. Bearings 14 are held in motor end closure plate 15 which is secured at one end of the casing 10 and which defines coolant inlet apertures 16. The other end of casing 10 is closed by closure plate 17 which defines coolant outlet apertures 18. Plate 17 is suitably affixed adjacent flange 12, and serves as a mount for bearing collar 31 journalling the drive end of the hollow shaft 13.

Coolant entrance 19 is formed in casing 10 and opens into the interior of a compartment 20 formed between the closure plate 15 and the flange 11. When assembled in a vehicle, a similar traction motor is intended to be mounted back to back to motor 9 at flange 11 to form the drive axle of a vehicle whereby compartment 20 will be essentially closed. Alternatively, the traction motor may be used by itself in which case the end of the compartment 20 is closed by a suitable closure plate (not shown) affixed to flange 11. Flange 12 is adapted to be connected to the final drive housing (not shown) of the vehicle.

A coolant stream is forced from a source (not shown) to enter the casing through entrance 19 where it divides; part of the stream passing through apertures 16 and the remainder entering the mouth of the hollow armature shaft 13.

Field poles 21 carrying field windings 22 are bolted to the casing. Armature windings 23 are embedded in coil slots formed in the periphery of a stack of armature laminations 24 to be described in greater detail below.

Bracket 27, only a portion of which is shown in FIG. 2 and which forms part of a safety brake shoe assembly, is secured to closure plate 15. A brake drum 28 is splined onto the mouth or inlet end of the hollow shaft 13 and secured there by a retainer nut 29.

As best seen in FIG. 2 the hollow armature rotor 13 is formed from five separate sections welded together. A hollow armature shaft extension 31 is welded as at 36 to a bell-shaped casting 32 which in turn is welded as at 37 to shaft section 33. This shaft section is welded as at 38 to a cylindrical section 34 which, in turn is welded as at 39 to a solid drive end section 35. The drive end section may be keyed or splined as at 40 to mount a drive gear (not shown). Except for the wall portion 41 in shaft section 33, the armature rotor shaft is hollow up to drive end section 35. This hollow shaft construction materially reduces the weight of the motor and yet is sufficiently stiff so as not to vibrate when operating at high speed. Wall portion 41 is provided to prevent any foreign particles which may accidentally be in the coolant stream from entering cylindrical section 34 and unbalancing the rotor. This wall portion also acts in conjunction with the bell-shaped casting to deflect the coolant stream to the armature stack.

Armature lamination stack 24 is mounted on the shaft between finger plates 43 and 44, portions of which are shown as phantom lines in FIG. 2. Finger plate 43 abuts a coil support 45 which has spokes 46 and which is welded as at 47 to the solid drive end section 35 of the hollow shaft. The lamination stack is axially loaded between the coil support and the shoulder 48 of shaft section 33. The lamination stack and the two finger plates are keyed to the shaft as by key 50.

Each lamination has an inner, an intermediate and an outer circle of circumferentially spaced holes, which when stacked to form the armature lamination stack 24 together form inner coolant passages 51 shown in phantom lines in FIG. 2, intermediate coolant passages 52 shown in solid lines and outer coolant passages 53 shown in phantom lines. Registering with coolant passages 51, 52 and 53 are counterpart passages 54, 55 and 56 formed in the shoulder 48 of shaft section 33 and in finger plates 43 and 44.

Forced coolant entering the mouth of the hollow shaft from compartment 20 passes through the core of the lamination stack exiting between the spokes 46 of the coil support and exhausting through outlet apertures 18 to atmosphere.

Forced coolant entering inlet apertures 16 from compartment 20 passes through the open areas between the periphery 60 of the rotating member and the case 10 such as the air gap 61 between the rotor periphery and the pole face 62 of field pole 21 and similarly exits to atmosphere through outlet aperture 18.

One feature of the present invention is that the percent by volume of the total coolant flow leaving the compartment via inlet apertures 16 and via the mouth of the hollow shaft can be regulated. For motors designed to operate at high speeds, a greater percent by volume of coolant should be exhausted via the path through the hollow armature shaft than the path provided by the air gap, to avoid serious windage problems. The percent volume distribution through the armature core and along the air gap may be conveniently regulated in a number of ways; the size and number of the inlet apertures 16 may be varied; the diameter of the mouth of the shaft may be varied; or, the relative accessibility of the total coolant flow to the inlet apertures and to the mouth of the shaft may be adjusted.

Also mounted on the hollow shaft 13 between a tubular shell 67 having a V-ring 68 and a clamping V-ring 69 are commutator bars 66. The bars 66 are axially loaded by tightening a retaining nut 70 on a threaded portion 67a formed at the end of shell 67.

Where weight is not a consideration, the armature shaft 13' of FIG. 3 may be substituted for the hollow armature shaft 13 of FIG. 2. The armature shaft 13' is identical with shaft 13 except for a solid shaft portion 71 which replaces shaft sections 33, 34 and 35 of shaft 13.

The armature shaft illustrated in FIG. 4 is a further modification of the armature shaft of FIG. 2. In the construction of FIG. 4, the portion 81 of the shaft 13″ beneath a lamination stack 90 is solid. Unlike the shaft of FIGS. 1, 2 and 3, shaft 13″ is formed of two sections 81 and 82 of substantially uniform diameter which are welded together as at 83. Section 82 is hollow, the end portion adjoining section 81 having a number of circumferential holes 85 formed therein. Forced coolant entering the mouth of the shaft 13″ exits through holes 85 into annular compartment 86 formed by a commutator shell 87 surrounding the end portion of hollow section 82. The coolant then continues into and through the two passages 88 and 89 in the armature lamination stack 90. Shaft portion 81 may be made hollow if weight is an important consideration.

The invention shown in FIGS. 1-4 has been taught in relation to having coolant flow from right to left. This leftward direction of forced flow is assisted by the natural pumping action which tends to suck coolant into the mouths of shafts 13, 13' or 13″ when the rotor is spinning and which tends to urge it to exit from the rear of the rotor. Referring to FIG. 4, for example, such pumping action arises because of the increase in radial distance of the internal radius from the shorter internal radius of hollow shaft 82 to the longer internal radius of annular compartment 86 measured from the center-line of the hollow shaft. In cases where it is preferred that the coolant flow in reverse direction, that is, from left to right as viewed in FIGS. 1-4, means, such as the impeller assembly of FIG. 5, may be employed to overcome or alter the effect of the above-described natural pumping action. Referring to FIG. 5 an impeller assembly 110 is shown mounted at the mouth of the hollow shaft 13″ of FIG. 4. A bearing cage 102 is installed on the shaft between an abutting shoulder 100 and a lock-type washer 104 and a retaining nut 106 threaded at the mouth of the hollow shaft. The mouth is counterbored as at 108.

The impeller assembly is piloted in the counterbore and is secured to the end of the shaft by a plurality of bolts 112 which thread into holes drilled into the retainer nut. The impeller assembly, which may be a casting, has a plurality of radially extending blades 114, four of which have an enlarged portion 118 equally spaced around the circumference of the assembly. A cover plate 116 is attached by bolts 120 threaded into the enlarged portions 118 of the blades.

Since the radius of the impeller assembly is equal to or greater than the radius of annular compartment 86 measured from the center line of the hollow shaft, the above-described pumping action is offset by this impeller assembly feature of the invention.

It will be understood that the impeller assembly shown in FIG. 5 mounted at the mouth of the hollow shaft 13″ of FIG. 4 can also be mounted to the mouth of hollow shaft 13 or 13' of FIGS. 2 and 3, respectively, with such minor mechanical adaptations as is necessary. For example, the impeller assembly could be secured to the retaining nut 29 or brake drum 28 of FIG. 2. In this way a coolant flow reversed in direction from that described with respect to FIGS. 1-4 may be effected. Consequently, apertures 18 in plate 17 would become inlet apertures being fed from a source (not shown) by flow channeling means (not shown) in juxtaposition therewith and apertures 16 in plate 15 would become outlet apertures. Compartment 20 would become an exhaust chamber. The coolant forced through apertures 18 would divide, a portion passing through the interior of the armature and exiting from the mouth of the hollow shaft, and the remaining portion passing between the exterior of the armature and the interior of the casing and exiting from apertures 16. The volume of coolant exiting from the mouth of the hollow shaft as compared to the volume exiting from apertures 16 is proportioned by altering the size and number of apertures 16, the internal diameter of the hollow shaft or by varying the magnitude of the sucking action of the impeller assembly.

We claim:
1. In a cooling arrangement for a dynamoelectric machine having a casing which encloses a rotor, and a stator mounted to the inside walls of the casing, and having a source of forced coolant associated therewith, the combination comprising a rotor shaft journalled in either end of the casing and having a hollow first end portion which forms part of a first coolant flow path and having a second end portion separated from the first portion by an intermediate section of greater diameter, a rotor core mounted on the second end portion of the shaft and having a plurality of passages extending therethrough in parallel relation to the axis thereof which communicate with the interior of the casing at one end and which communicate with the hollow first end portion of the shaft through said intermediate section thereof to complete the first coolant flow path, and an apertured partition extending between the casing and the shaft near the first end thereof defining a coolant input region at the first end of the shaft and dividing the coolant flow in selective proportions between the first path and a second path defined by the apertures of the partition and the open areas between the rotor periphery and the inside walls of the casing.

2. The cooling arrangement of claim 1 wherein the apertured partition for dividing the coolant stream in selective proportions between the first and second paths consists of a first end casing which journals the hollow first end portion of the shaft.

3. In a cooling arrangement for a dynamoelectric machine having a casing which encloses a rotor, and a stator mounted to the inside walls of the casing, and having a source of forced coolant associated therewith, the combination comprising a rotor shaft journalled in either end of the casing and having a hollow end portion which forms part of a first coolant path, a rotor core mounted on the shaft and having a plurality of passages extending therethrough in parallel relation to the axis thereof and which communicate with the hollow end portion of the shaft and which complete the first coolant flow path, a first end casing which journals the hollow end portion of the shaft and which has at least one aperture through which coolant may pass thereby dividing the coolant in selective proportions between the first path and a second path defined by the open area between the rotor periphery and the inside walls of the casing, a second end casing which journals the other end of the shaft and which also has at least one aperture through which the coolant may pass, and wherein at least the longitudinal axis of one of said plurality of said passages is located at a radius greater than the internal radius of said hollow end portion measured from the longitudinal axis of said rotor shaft so as to induce a natural pumping action which draws the coolant into said hollow end portion and which urges it to exit from said second casing end, and impeller means secured to the mouth of the hollow end portion of the rotor shaft and adapted to offset the natural pumping action as the shaft rotates.

References Cited

UNITED STATES PATENTS

| | | | |
|---|---|---|---|
| 727,686 | 1/1902 | Priest | 310—62 |
| 2,436,320 | 2/1948 | Miner | 310—62 |
| 3,189,769 | 6/1965 | Willyoung | 310—52 |

JOHN F. COUCH, *Primary Examiner.*

DENNIS HARNISH, *Assistant Examiner.*

U.S. Cl. X.R.

310—62